(12) United States Patent
Berger et al.

(10) Patent No.: US 8,263,239 B2
(45) Date of Patent: Sep. 11, 2012

(54) LAMINATED MAGNETIC THIN FILMS FOR MAGNETIC RECORDING WITH WEAK FERROMAGNETIC COUPLING

(75) Inventors: Andreas Klaus Berger, San Jose, CA (US); Hoa Van Do, Fremont, CA (US); Eric Edward Fullerton, Morgan Hill, CA (US); David Thomas Margulies, Los Gatos, CA (US); Natacha Frederique Supper, Campbell, CA (US)

(73) Assignee: HGST Netherlands B.V., Amsterdam (NL)

( * ) Notice: Subject to any disclaimer, the term of this patent is extended or adjusted under 35 U.S.C. 154(b) by 1693 days.

(21) Appl. No.: 11/475,281

(22) Filed: Jun. 26, 2006

(65) Prior Publication Data

US 2007/0298285 A1 Dec. 27, 2007

(51) Int. Cl.
*G11B 5/66* (2006.01)
(52) U.S. Cl. .................................. 428/828.1
(58) Field of Classification Search ............... 428/828, 428/828.1, 829
See application file for complete search history.

(56) References Cited

U.S. PATENT DOCUMENTS

| | | | |
|---|---|---|---|
| 6,077,586 A | 6/2000 | Bian et al. | |
| 6,280,813 B1 | 8/2001 | Carey et al. | |
| 6,567,236 B1 | 5/2003 | Doerner et al. | |
| 6,773,834 B2 | 8/2004 | Margulies et al. | |
| 6,881,503 B2 | 4/2005 | Lu et al. | |
| 6,939,626 B2 | 9/2005 | Tang | |
| 7,092,209 B2 | 8/2006 | Hsiao et al. | |
| 2002/0168547 A1 | 11/2002 | Kanbe et al. | |
| 2005/0019609 A1* | 1/2005 | Tang | 428/694 TM |
| 2005/0058855 A1* | 3/2005 | Girt | 428/694 TS |
| 2005/0259351 A1 | 11/2005 | Do et al. | |
| 2005/0259362 A1 | 11/2005 | Do et al. | |
| 2006/0177703 A1* | 8/2006 | Takenoiri et al. | 428/829 |
| 2006/0183003 A1 | 8/2006 | Minardi et al. | |
| 2006/0210834 A1 | 9/2006 | Do et al. | |
| 2006/0210835 A1 | 9/2006 | Do et al. | |
| 2007/0243418 A1* | 10/2007 | Fullerton et al. | 428/828 |

FOREIGN PATENT DOCUMENTS

| | | |
|---|---|---|
| EP | 1059629 A2 | 12/2000 |
| JP | 2006048900 A * | 2/2006 |

* cited by examiner

*Primary Examiner* — Holly Rickman
*Assistant Examiner* — Lisa Chau
(74) *Attorney, Agent, or Firm* — G. Marlin Knight

(57) ABSTRACT

A laminated magnetic recording structure for use in perpendicular or longitudinal recording is described. A small amount of ferromagnetic coupling is added between the two magnetic layers that are sufficiently decoupled to switch independently. In one embodiment the coupling is achieved by doping the spacer layer with a ferromagnetic material. Ruthenium (Ru), which is a preferred nonmagnetic material for spacer layers with cobalt (Co) being the preferred magnetic material. The weak ferromagnetic coupling can also be achieved through the use of platinum, palladium and alloys thereof for the spacer layer without the addition of a ferromagnetic element, but alternatively they can also be doped with ferromagnetic elements. For embodiments for perpendicular recording the spacer layer further can additionally comprise oxides of one or more elements selected from the group consisting of Si, Ta, Ti, Nb, Cr, V and B.

18 Claims, 4 Drawing Sheets

LAMINATED MAGNETIC THIN FILMS FOR MAGNETIC RECORDING WITH WEAK FERROMAGNETIC COUPLING

FIELD OF THE INVENTION

The invention relates to magnetic thin film media with laminated magnetic layers and more particularly to magnetic thin film media with laminated magnetic layers that have weak ferromagnetic coupling and more particularly to magnetic properties and selection of materials used for the plurality of thin films in such media.

BACKGROUND OF THE INVENTION

A typical prior art head and disk system 10 is illustrated in block form in FIG. 1. In operation the magnetic transducer 20 is supported by the suspension 13 as it flies above the disk 16. The magnetic transducer 20, usually called a "head" or "slider," is composed of elements that perform the task of writing magnetic transitions (the write head 23) and reading the magnetic transitions (the read head 12). The electrical signals to and from the read and write heads 12, 23 travel along conductive paths (leads) 14 which are attached to or embedded in the suspension 13. The magnetic transducer 20 is positioned over points at varying radial distances from the center of the disk 16 to read and write circular tracks (not shown). The disk 16 is attached to a spindle 18 that is driven by a spindle motor 24 to rotate the disk 16. The disk 16 comprises a substrate 26 on which a plurality of thin films 21 are deposited. The thin films 21 include ferromagnetic material in which the write head 23 records the magnetic transitions in which information is encoded.

The conventional disk 16 for longitudinal recording includes substrate 26 of glass or AlMg with an electroless coating of $Ni_3P$ that has been highly polished. The thin films 21 on the disk 16 typically include one or more chromium or chromium alloy underlayers 33 (see FIG. 2) and at least one ferromagnetic layer 34 based on various alloys of cobalt. For example, a commonly used alloy is CoPtCr. Additional elements such as tantalum and boron are often used in the magnetic alloy. A protective overcoat layer 35 is used to improve wearability and corrosion resistance. Various seed layers 32, preseed layers 31 and multiple underlayers 33 have all been described in the prior art.

The layer structure shown in FIG. 2 can be used with a variety of magnetic layer stacks 34. For example, two or more laminated magnetic layers can be used and antiferromagnetically coupled layers structures can be substituted for any or all of the magnetic layers.

A simple version of a laminated magnetic layer stack 34 (FIG. 3) includes an upper magnetic layer 36 and a lower magnetic layer 38 that are separated by nonmagnetic spacer layer 37. It is known that substantially improved signal-to-noise ratios (SNR) can be achieved by the use of a laminated magnetic layer structure. The reduced media noise is due to the effective doubling of the media grains by means of suppressing the exchange coupling between the magnetic layers which allows the upper recording layer to switch independently from the lower magnetic layer. The use of lamination for noise reduction has been extensively studied to find the favorable spacer layer materials, including Cr, CrV, Mo and Ru, and spacer thicknesses from a few angstroms upward that result in the best decoupling of the magnetic layers and the lowest media noise.

FIG. 4 shows an embodiment of a prior art laminated magnetic media in which the lower magnetic layer is replaced with an antiferromagnetically coupled (AFC) structure 41 comprising an AFC-master magnetic layer 42, an AFC spacer 43 and an AFC slave magnetic layer 44.

In U.S. Pat. No. 6,280,813 to Carey, et al. a layer structure is described that includes at least two ferromagnetic films antiferromagnetically coupled together across a nonferromagnetic coupling/spacer film. In general, it is said that the exchange coupling oscillates from ferromagnetic to antiferromagnetic with increasing coupling/spacer film thickness and that the preferred 6 Angstrom thickness of the ruthenium coupling/spacer layer was selected because it corresponds to the first antiferromagnetic coupling peak in the oscillation for the particular thin film structure. Materials that are appropriate for use as the nonferromagnetic coupling/spacer films include ruthenium (Ru), chromium (Cr), rhodium (Rh), iridium (Ir), copper (Cu), and their alloys. Because the magnetic moments of the two antiferromagnetically coupled films are oriented antiparallel in Carey's media, the net remanent magnetization-thickness product ($M_r t$) of the recording layer is the difference in the $M_r t$ values of the two ferromagnetic films. This reduction in $M_r t$ is accomplished without a reduction in the thermal stability of the recording medium because the volumes of the grains in the antiferromagnetically coupled films add constructively. An embodiment of the structure includes two ferromagnetic CoPtCrB films, separated by a Ru spacer film having a thickness selected to maximize the antiferromagnetic exchange coupling between the two CoPtCrB films. The top ferromagnetic layer is designed to have a greater $M_r t$ than the bottom ferromagnetic layer, so that the net moment in zero applied magnetic field is low, but nonzero. The Carey '813 patent also states that the antiferromagnetic coupling is enhanced by a thin (5 angstroms) ferromagnetic cobalt interface layer added between the coupling/spacer layer and the top and/or bottom ferromagnetic layers. The patent mentions, but does not elaborate on the use CoCr interface layers.

Published European patent application EP1059629 by Abarra, et al. describes the use of a nonmagnetic Ru-M3 coupling layer 221 with a thickness from 4 to 10 angstroms to couple the adjacent magnetic layer in an antiparallel orientation, i.e., antiferromagnetic coupling. The application lists the M3 elements as Co, Cr, Fe, Mn, Ni and alloys thereof. The nonmagnetic coupling layer of Abarra is said to have a thickness range of approximately 0.4 to 1.0 nm in order to establish the antiparallel magnetizations of the magnetic layers. (See paragraph 0141). In order to maintain the hcp structure of the coupling layer, the embodiment using Ru—Co is limited to 0 to 50 at % Co. (See paragraph 0144).

One disadvantage that laminated media has is that it generally needs to be thick so that each of the magnetic layer is independently stable. The large Mrt increases the pulse width at 50% amplitude (PW50), which reduces media resolution and makes ultra-high linear recording densities more difficult to achieve. The overall thickness of the media can also be a problem for the writing process with the lower magnetic layer 38 being rather far away from the write head.

The previous discussion relates to longitudinal recording. In perpendicular magnetic recording the orientation of the magnetic domains is perpendicular to the plane of the recording layer on the disk. A common type of perpendicular magnetic recording system uses a single write pole type of recording head and a recording medium includes a ferromagnetic recording layer (RL) over a "soft" or relatively low-coercivity magnetically permeable underlayer (SUL). The perpendicular recording layer is selected to have its c-axis oriented substantially out-of-plane or perpendicular to the plane of the recording layer. Granular ferromagnetic cobalt alloys, such as a CoPtCr alloy, can be designed and fabricated for use in perpendicular recording. The granular cobalt alloy RL should also have a well-isolated fine-grain structure to produce a high-coercivity media and to reduce intergranular exchange coupling, which is responsible for high intrinsic media noise. Enhancement of grain segregation in the cobalt alloy RL can be achieved by the addition of oxides, including oxides of Si, Ta, Ti, Nb, Cr, V, and B. These oxides tend to precipitate to the grain boundaries and together with the elements of the cobalt alloy form nonmagnetic intergranular material.

SUMMARY OF THE INVENTION

The invention is a laminated magnetic recording structure that can be adapted for use in perpendicular or longitudinal recording. The invention improves on the performance of prior art laminated media by adding a small amount of ferromagnetic coupling between the two magnetic layers that are sufficiently decoupled to switch independently. An embodiment of the laminated magnetic recording structure comprises two magnetic layers separated by a suitable spacer layer selected to achieve ferromagnetic coupling strength that is smaller in strength than either the coercivity of the upper or the lower magnetic layer, which will be called weak coupling. In one embodiment the coupling is achieved by doping the spacer layer with a ferromagnetic material. Ruthenium (Ru), which is a preferred material for spacer layers, can comprise the majority of the spacer layer with cobalt (Co) being the preferred magnetic material. In one embodiment chromium (Cr) is added so that the spacer layer is RuCoCr. The total Ru content is preferably from 40 to 80 atomic percent. Examples of the doping material are CoCr22 and CoCr11, but other materials can be used. The weak ferromagnetic coupling can be achieved through the use of platinum, palladium and alloys thereof for the spacer layer without the addition of a ferromagnetic element, but alternatively they can also be doped with ferromagnetic elements such as cobalt. For embodiments for perpendicular recording the spacer layer further can additionally comprise oxides of one or more elements selected from the group consisting of Si, Ta, Ti, Nb, Cr, V and B.

The optimum ferromagnetic coupling and the optimum doping level can be determined empirically, for example, by measuring the magnetic decay rate and the performance parameters such as the bit error rate. The ferromagnetic coupling should be high enough to increase the stability of the media, but not so high that the benefit of laminated media is lost. If the ferromagnetic coupling is increased beyond a critical point the coupling becomes too high and results in a sharp loss of performance. The media designed according to the invention have improved stability as a result of the weak ferromagnetic coupling. The ferromagnetic coupling is designed so that the benefits of prior art laminated media such as improved noise are maintained. The writability of the media is increased. Because weak ferromagnetic coupling is used, constraints on the thickness of the spacer layer are relieved by the invention. In one embodiment the spacer layer is preferably from 1 to 2.5 nm thick, which results in increased manufacturability.

DETAILED DESCRIPTION OF THE INVENTION AND THE PREFERRED EMBODIMENTS

Figure 1:
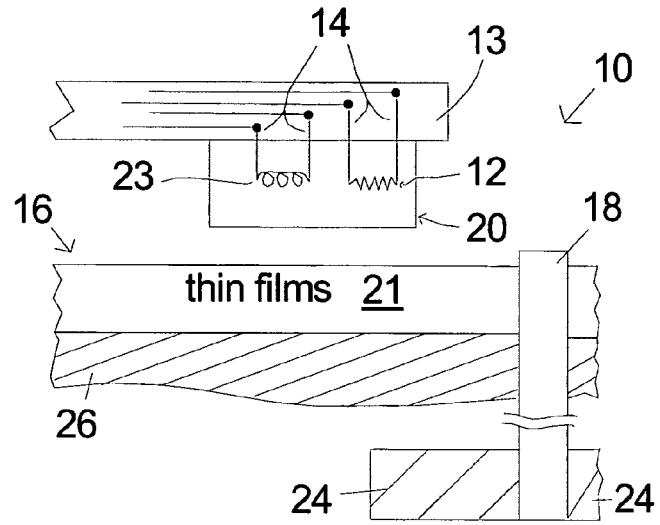
FIG. 1 is a symbolic illustration of the showing the relationships between the head and associated components in a disk drive.
Figure 2:
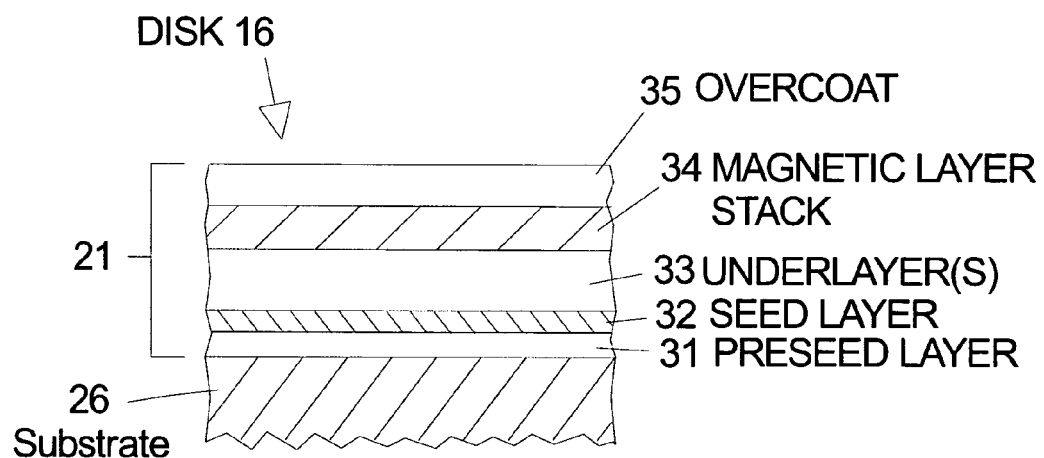
FIG. 2 is an illustration of a prior art layer structure for a magnetic thin film disk with which the magnetic layer stack of the invention can be used.
Figure 3:
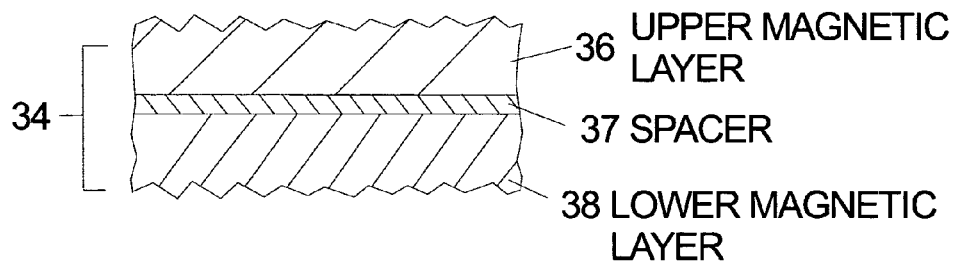
FIG. 3 is an illustration of a two layer laminated magnetic layer stack for a magnetic thin film disk according to the prior art.
Figure 4:
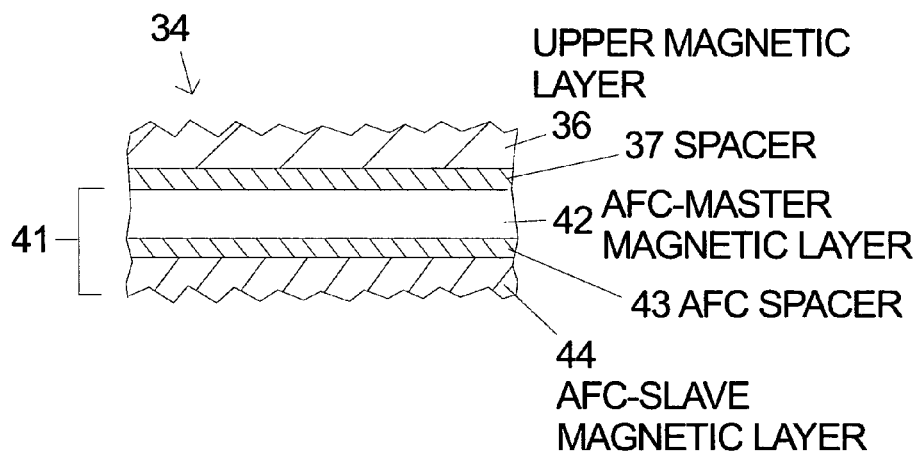
FIG. 4 is an illustration of a laminated magnetic layer stack with the lower magnetic layer replaced with an antiferromagnetically coupled magnetic layer stack for a magnetic thin film disk according to the prior art.
Figure 5:
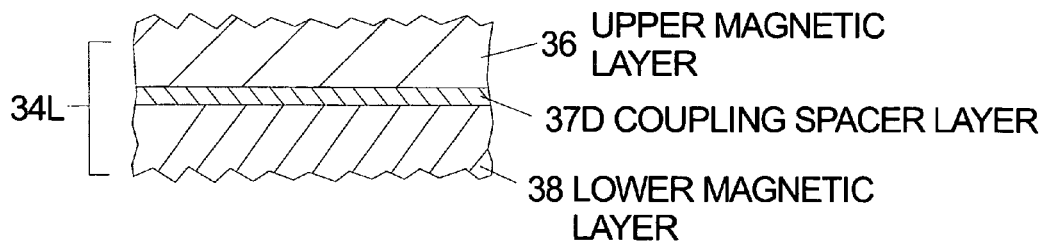
FIG. 5 is an illustration of a first embodiment of the invention for longitudinal or perpendicular recording. This embodiment has a laminated magnetic layer stack with the coupling spacer layer selected to achieve weak ferromagnetic coupling.

An embodiment of a simple laminated magnetic recording structure 34L according to the invention is shown in FIG. 5. This layer structure can be used for either longitudinal or perpendicular recording. The other layers in the media will be different according to whether longitudinal or perpendicular recording is to be used. The coupling spacer layer 37D is designed to achieve weak ferromagnetic coupling below the coercivity of the upper and lower magnetic layers. Ruthenium (Ru) is a preferred material for coupling spacer layer 37D. Ru can comprise the majority of the coupling spacer layer with cobalt (Co) being the preferred magnetic material to be added to achieve the desired level of coupling. The total Ru content should be greater than 40 atomic percent (at. %) and is preferably from 40 to 80 atomic percent. Alternatively, in other embodiments one or more additional nonmagnetic elements such as boron (B), tantalum (Ta) or chromium (Cr) can be added to the coupling spacer layer. Examples are RuCoCr, RuCoB, RuCoTa, etc. Examples of the doping material for the RuCoCr alternative embodiment include CoCr22 and CoCr11, but other materials can be used. For the composition Ru(1−x−y)Co(x)Cr(y) x+y is less than 60 at. % and x is 20 to 55 at. % and y is 0 to 20 at. %. When elements other than Cr are added, their percentage should be below the 15 at. % level.

Alternatively the coupling spacer layer 37D can be other suitable coupling materials including platinum (Pt), palladium (Pd) and alloys thereof that achieve ferromagnetic coupling. When Pt, Pd or their alloys are used for the coupling spacer layer they may be used pure or doped with a ferromagnetic material such as Co, Ni or Fe. The guidelines for the composition are for Co (Pt or Pd) 0-30% Co-concentration; for Fe (Pt or Pd) 0-30% Fe-concentration; and for Ni (Pt or Pd) 0-50% Ni-concentration.

The thickness of the coupling spacer layer is determined empirically. In general the thickness of the coupling spacer layer depends in part on the particular composition used. The following table gives guidance on the expected thickness of the coupling spacer layer:

| Ru at. % | Co at. % | Cr at. % | Thickness (nm) |
|---|---|---|---|
| 54 | 36 | 10 | 1.12 |
| 70 | 24 | 6 | 0.86 |
| 54 | 41 | 5 | 1.12 |
| 70 | 27 | 3 | 0.86 |
| 50 | 39 | 11 | 1.20 |

In one embodiment the expected range of thickness is between 0.4-1.0 nm. In another embodiment the expected range of thickness is preferably between 1.0-5.0 nm and even more preferably between 1.0-2.5 nm. There is an advantage to using spacer layers thicker than 1 nm. The processing gets more robust and properties like the coupling strength distribution, for instance, are expected to be narrower.

A method of determining the optimum composition and thickness of the coupling spacer is as follows. First the basic layers, materials and thickness are select for a prior art laminated structure. A set of sample disks is then prepared with varying compositions of the spacer layer material, for example, RuCoX. The composition and the thickness of the coupling spacer layer can be varied at the same time. Alternatively the composition or the thickness can be varied independently while the other parameter is kept constant. Measuring the decay rate of magnetic signals recorded on the samples with varying amounts of ferromagnetic coupling allows the improved stability of the media to be determined.

One way to design media according to the invention is to empirically determine a level of coupling that results in reduced magnetic decay (increased stability) and does not decrease the recording performance. If the ferromagnetic coupling is increased beyond a critical point the coupling becomes too high and results in a sharp loss of performance. The benefits of laminated media require that the two magnetic layers be sufficiently decoupled to switch independently and excessive coupling results in the layers loosing their independence. Thus, media optimized according to the invention have a sufficient level of ferromagnetic coupling to achieve improved stability, but not such a high level of coupling that the benefits of laminated magnetic layers are lost. The ferromagnetic coupling field between the ferromagnetic layers will be below the coercivity of the upper ferromagnetic layer and below the coercivity of the lower ferromagnetic layer.

Standard tests of the magnetic recording performance and magnetic decay are run on each sample. Measuring the bit error rate is one way to gauge the recording results. The results can be collected in a matrix to find the most suitable coupling layer thickness—composition based on the recording performance and stability. Once the correct coupling layer has been established, the thickness of the upper magnetic layer 36, the thickness of the lower magnetic layer 38, or both can be lowered to take advantage of the gain in stability. Alternatively this step could be anticipated in the original selection of the thickness of the upper and lower magnetic layers before the samples are made.

Figure 6:
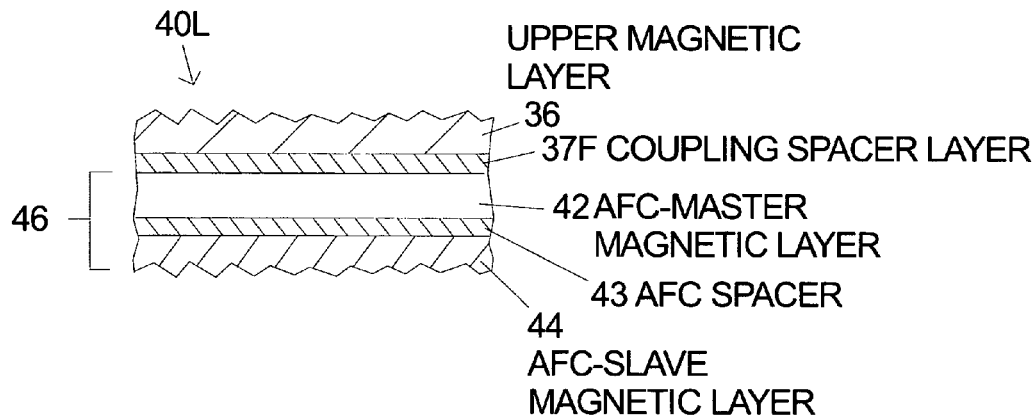
FIG. 6 is an illustration of a second embodiment of the invention for longitudinal recording. This embodiment has a laminated magnetic layer stack with the lower magnetic layer replaced with an antiferromagnetically coupled magnetic layer stack.

A second embodiment of the invention for use in longitudinal recording is shown in FIG. 6. In this embodiment of a laminated magnetic recording structure 40L, the lower magnetic layer 38 of the previous embodiment is replaced by an antiferromagnetically coupled (AFC) structure 46 comprising an AFC-master magnetic layer 42, an AFC spacer 43 and an AFC slave magnetic layer 44. An exemplary embodiment can include the following:

upper magnetic layer 36 CoPt13Cr19B10 with an Mrt of 0.4 memu/cm$^2$;

coupling spacer layer 37F RuCoCr 0.6 nm thick;

AFC master magnetic layer 42 CoPt12Cr20B7 with an Mrt of 0.4 memu/cm$^2$;

AFC spacer 43 Ru 0.6 nm thick; and

AFC slave magnetic layer 44 CoCr10Ta2 with an Mrt of 0.12 memu/cm$^2$.

Since the invention uses ferromagnetic cobalt in the coupling spacer layer 37F to achieve weak ferromagnetic coupling across the coupling spacer layer 37F, it can have a thickness that would normally result in AFC coupling. Thus, in the example above a 0.6 nm thick spacer layer would typically be expected to result in antiferromagnetic coupling, but the addition of ferromagnetic cobalt according to the invention ensures that the coupling is weak ferromagnetic coupling. When the AFC structure is used in this embodiment, adjustments in the composition, thickness or both can be made to take advantage of the stability gain due to the weak ferromagnetic coupling between the upper magnetic layer 36 and the AFC master magnetic layer 42. For instance, the thickness of the upper magnetic layer 36, the AFC master magnetic layer 42, or both can be lowered to take advantage of the gain in stability. Also, the thickness of the upper magnetic layer 36, the AFC master magnetic layer 42 and the AFC slave layer 44, or all three can be lowered to take advantage of the gain in stability.

Figure 7:
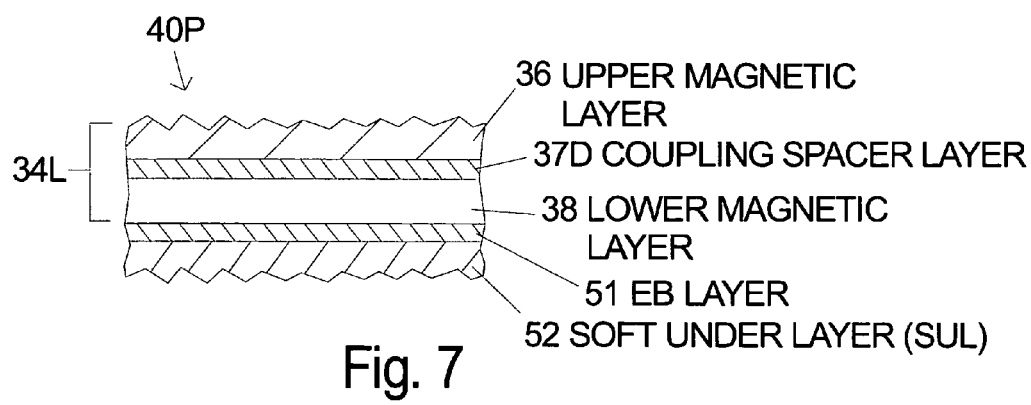
FIG. 7 is an illustration of a third embodiment of the invention laminated magnetic layer stack for perpendicular recording.

An embodiment of the invention for perpendicular recording is shown in FIG. 7. The layer structure 40P includes soft underlayer (SUL) 52 which is typically used in prior art media for perpendicular recording. The SUL serves as a flux return path for the field from the write pole to the return pole of the recording head. A seed or onset layer (not shown) may be deposited prior to SUL to control the growth characteristics of the SUL. Also the SUL might contain multiple soft magnetic layers that are either in laminated form or antiferromagnetically coupled with each other. An alternative embodiment of perpendicular media includes an exchange break (EB) layer 51 between the SUL and the lower magnetic layer 38. The exchange break layer 51 serves to break the magnetic exchange coupling between the magnetically permeable films of the SUL and the lower magnetic layer 38 and to facilitate epitaxial growth of the lower magnetic layer 38. The exchange break layer might also consist of several layers for the purpose of providing an improved template for the lower magnetic layer 38.

The optimum thickness and composition for the perpendicular recording embodiment can be determined by the same empirical method described above for longitudinal media.

For embodiments of the invention for perpendicular recording, in addition to the materials mentioned above for the coupling spacer layer, the coupling spacer layer can include one or more oxides of one or more elements selected from the group consisting of Si, Ta, Ti, Nb, Cr, V and B.

Figure 8:
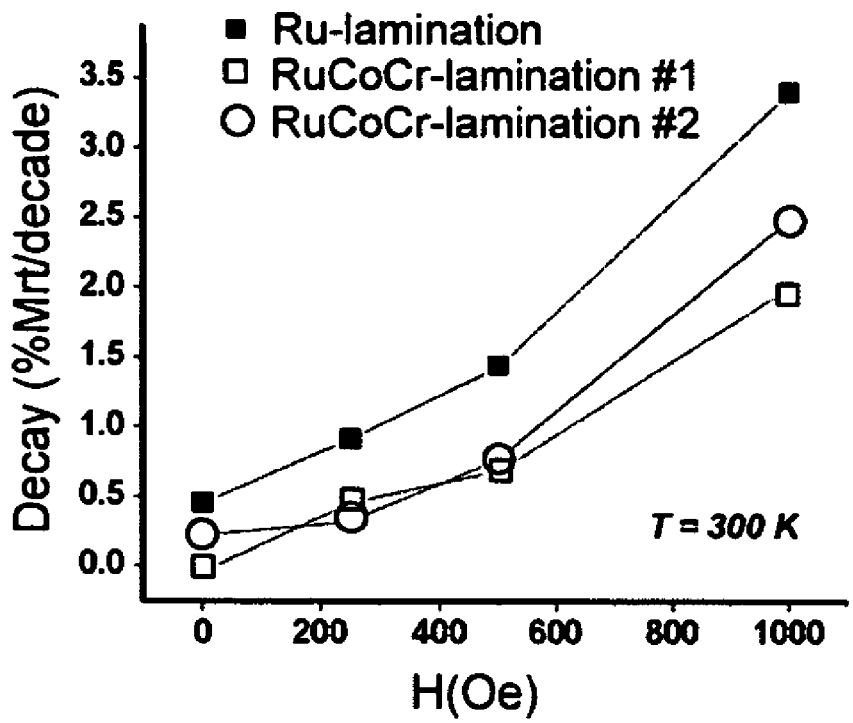
FIG. 8 is a graph of decay (% Mrt/decade) versus the applied (negative) reverse field for two samples according to the invention and one sample with a prior art Ru spacer layer.
Figure 9:
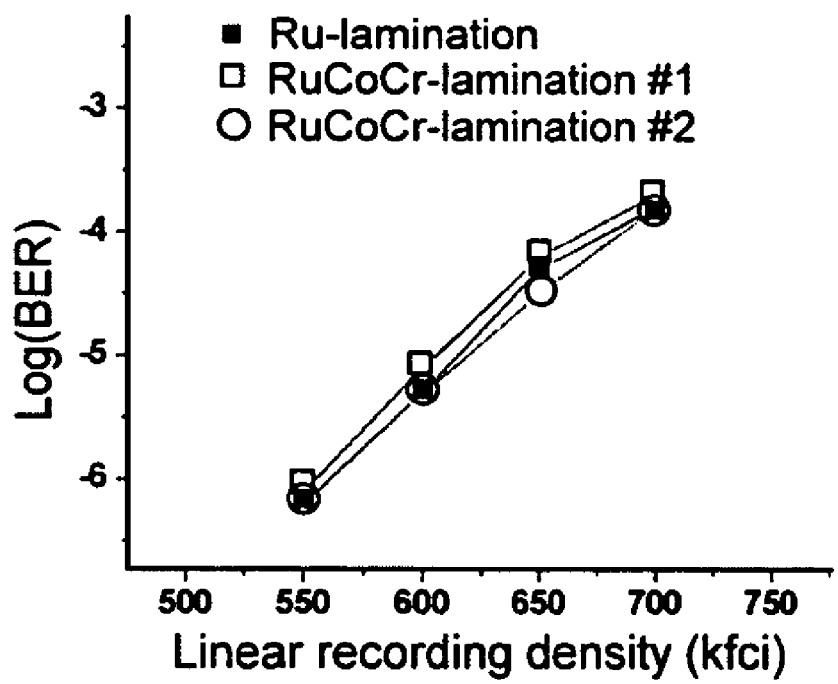
FIG. 9 is a graph of the log of the bit error rate (BER) versus the linear recording density for two samples according to the invention and one sample with a prior art Ru spacer layer.

Data from three sample disks will be described. FIG. 8 is a graph of decay (% Mrt/decade) versus the applied (negative) reverse field for two samples according to the invention and one sample with a prior art Ru spacer layer 0.6 nm thick. FIG. 9 is a graph of the log of the bit error rate (BER) versus the linear recording density for the same samples shown in FIG. 8. The structure of the sample media was a longitudinal structure according to FIG. 6. The upper magnetic layer 36 was CoPt13Cr19B10 with an Mrt of 0.4 memu/cm$^2$.

For disk #1 the coupling spacer layer 37F was 1.12 nm thick and was composed of Ru54Co36Cr10, i.e., RuCoCr-lamination #1 had a composition of 54 at. % Ru, 36 at. % Co, and 10 at. % Cr. For disk #2 the coupling spacer layer 37F was 0.86 nm thick and was composed of Ru70Co24Cr6, i.e., RuCoCr-lamination #2 had a composition of 70 at. % Ru, 24 at. % Co, and 6 at. % Cr. The AFC structure was the same for each of the three sample disks. The AFC master magnetic layer 42 was CoPt12Cr20B7 with an Mrt of 0.4 memu/cm$^2$. The AFC spacer 43 was Ru 0.6 nm thick. The AFC slave magnetic layer 44 was CoCr10Ta2 with an Mrt of 0.12 memu/cm$^2$.

FIG. 8 shows the measured magnetization decay as a function of the applied (negative) reverse field. All measurements were made using a SQUID magnetometer after first magnetizing the samples in a sufficiently large (positive) field of 10 kOe. The data show that the magnetization decay is substantially reduced by means of the invention, a fact that is corroborated by measurements of KuV, i.e. the activation barrier of thermal magnetization reversal, as well as measurements of the signal decay for recorded pattern.

FIG. 9 shows the measured bit error rate (BER) values as a function of the linear recording density (in kilo-flux changes per inch). In this case the results show that the recording performance is virtually identical for these three disks, a fact that is also reflected in corresponding SNR, and other recording measurements.

Thus, from the comparison of these two figures it is clear that a stability enhancement is achieved by means of weakly ferromagnetically coupled laminated media according to the invention without a loss in recording performance.

The thin film structures described above can be formed using standard sputtering techniques. The films are sequentially sputter deposited with each film being deposited on the previous film. The atomic percent compositions given above are given without regard for the small amounts of contamination that invariably exist in sputtered thin films as is well known to those skilled in the art.

The invention has been described with respect to particular embodiments, but other uses and applications for the ferromagnetic structure according to the invention will be apparent to those skilled in the art.

The invention claimed is:

1. A thin film magnetic recording medium for use with a magnetic recording head comprising:
    an upper ferromagnetic layer;
    a lower ferromagnetic layer;
    a spacer layer separating the upper and lower ferromagnetic layers, the spacer layer including a ferromagnetic element and a nonmagnetic oxide of one or more elements selected from the group consisting of Si, Ta, Ti, Nb, Cr, V, and B, the spacer layer ferromagnetically coupling the upper ferromagnetic layer to the lower ferromagnetic layer, with a ferromagnetic coupling strength between the upper and lower ferromagnetic layers below a coercivity of the upper ferromagnetic layer and below a coercivity of the lower ferromagnetic layer.

2. The thin film magnetic recording medium of claim 1 wherein the spacer layer includes at least a first nonmagnetic element comprising at least 40 atomic percent of the spacer layer.

3. The thin film magnetic recording medium of claim 2 wherein the first nonmagnetic element is ruthenium, the ferromagnetic element in the spacer layer is cobalt, and the atomic percentage of cobalt is from 20 to 55 at. %.

4. The thin film magnetic recording medium of claim 3 wherein the spacer layer further comprises up to 20 at. % chromium (Cr).

5. The thin film magnetic recording medium of claim 2 wherein the first nonmagnetic element is platinum, the ferromagnetic element in the spacer layer is cobalt, and the atomic percentage of cobalt is from 0 to 30 at. %.

6. The thin film magnetic recording medium of claim 2 wherein the first nonmagnetic element is palladium, the ferromagnetic element in the spacer layer is cobalt, and the atomic percentage of cobalt is from 0 to 30 at. %.

7. The thin film magnetic recording medium of claim 1 wherein the spacer layer is platinum, palladium or alloys thereof.

8. The thin film magnetic recording medium of claim 1 wherein a thickness of the spacer layer is from 0.4-1.0 nm.

9. The thin film magnetic recording medium of claim 1 wherein a thickness of the spacer layer is from 1.0-2.5 nm.

10. The thin film magnetic recording medium of claim 1 wherein the lower magnetic layer further comprises an antiferromagnetically coupled (AFC) master layer, an AFC spacer layer and an AFC slave layer.

11. The thin film magnetic recording medium of claim 1 further comprising a magnetically soft underlayer beneath the lower ferromagnetic layer and wherein the upper and lower ferromagnetic layers have a c-axis preferred orientation perpendicular to a plane of the medium.

12. The thin film magnetic recording medium of claim 11 wherein the spacer layer is platinum, palladium or alloys thereof.

13. The thin film magnetic recording medium of claim 1 wherein the spacer layer includes at least 40 atomic percent ruthenium.

14. The thin film magnetic recording medium of claim 11 wherein the ferromagnetic element in the spacer layer is cobalt, and the atomic percentage of cobalt is from 20 to 55 at. %.

15. The thin film magnetic recording medium of claim 11 wherein the first nonmagnetic element is platinum, the ferromagnetic element in the spacer layer is cobalt, and the atomic percentage of cobalt is from 0 to 30 at. %.

16. The thin film magnetic recording medium of claim 2 wherein the first nonmagnetic element is palladium, the ferromagnetic element in the spacer layer is cobalt, and the atomic percentage of cobalt is from 0 to 30 at. %.

17. The thin film magnetic recording medium of claim 11 wherein a thickness of the spacer layer is from 0.4-1.0 nm.

18. The thin film magnetic recording medium of claim 11 wherein a thickness of the spacer layer is from 1.0-2.5 nm.

* * * * *